United States Patent
Wong et al.

(10) Patent No.: US 11,291,051 B2
(45) Date of Patent: Mar. 29, 2022

(54) METHODS AND DEVICES FOR RANDOM ACCESS

(71) Applicant: Alcatel Lucent, Boulogne Billancourt (FR)

(72) Inventors: Shin Horng Wong, Chippenham (GB); Sigen Ye, New Providence, NJ (US); Yu Chen, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 211 days.

(21) Appl. No.: 15/023,781

(22) PCT Filed: Sep. 27, 2013

(86) PCT No.: PCT/CN2013/084448
§ 371 (c)(1),
(2) Date: Mar. 22, 2016

(87) PCT Pub. No.: WO2015/042866
PCT Pub. Date: Apr. 2, 2015

(65) Prior Publication Data
US 2016/0242212 A1   Aug. 18, 2016

(51) Int. Cl.
*H04W 74/08* (2009.01)
*H04W 4/70* (2018.01)

(52) U.S. Cl.
CPC ......... *H04W 74/0833* (2013.01); *H04W 4/70* (2018.02); *H04W 74/08* (2013.01)

(58) Field of Classification Search
CPC .... H04W 74/0833; H04W 4/70; H04W 74/08
See application file for complete search history.

(56) References Cited

U.S. PATENT DOCUMENTS

| | | | |
|---|---|---|---|
| 2008/0233941 A1* | 9/2008 | Jen | H04W 74/002 455/418 |
| 2011/0292893 A1* | 12/2011 | Lee | H04W 4/50 370/329 |
| 2012/0163169 A1 | 6/2012 | Yang et al. | |

(Continued)

FOREIGN PATENT DOCUMENTS

| | | |
|---|---|---|
| CN | 102056322 A | 5/2011 |
| CN | 102438306 A | 5/2012 |
| WO | WO 2010/017223 A1 | 2/2010 |

OTHER PUBLICATIONS

U.S. Appl. No. 61/858,633, "Methods of Random Access Procedure for MTC coverage Enhancement", filed Jul. 2013.*

(Continued)

*Primary Examiner* — Thinh D Tran
(74) *Attorney, Agent, or Firm* — Fay Sharpe LLP

(57) ABSTRACT

One embodiment of the present disclosure relates to a method for random access in a base station supporting communication with at least one CE-MTC UE. The method comprises: receiving from a user equipment, repetition transmissions of a first message including a random access preamble; repeatedly transmitting to the user equipment a second message including a random access response, RAR, wherein the second message has a characteristic dependent upon a first repetition level. Another embodiment of the present invention also relates to corresponding method for random access in a user equipment. According to an aspect of the present disclosure, there are provided corresponding devices.

26 Claims, 4 Drawing Sheets

(56) References Cited

U.S. PATENT DOCUMENTS

| | | | | |
|---|---|---|---|---|
| 2014/0050213 | A1* | 2/2014 | Nguyen | H04W 56/0015 370/350 |
| 2016/0128011 | A1* | 5/2016 | Yang | H04W 56/0015 370/329 |
| 2016/0165640 | A1* | 6/2016 | Yang | H04W 4/005 370/336 |
| 2017/0094690 | A1* | 3/2017 | Zhang | H04W 74/0833 |
| 2017/0366999 | A1* | 12/2017 | Tsuboi | H04W 72/085 |

OTHER PUBLICATIONS

U.S. Appl. No. 6186410, Methods of Repeated PBCH Transmission for MTC coverage Enhancement, filed Aug. 2013.*
Huawei, Hisilicon, "Determining the repetition level during initial random access and non-initial random access", 3GPP TSG RAN WG1 Meeting #75, San Francisco, USA, Nov. 11-15, 2013, R1-135382, Agenda Item: 6.2.2.2.2, Document for: Discussion and decision, 4 pages.
Alcatel-Lucent, Alcatel-Lucent Shanghai Bell, "Configurable repetition level for PBCH", 3GPP TSG-RAN WG1 Meeting #73, Fukuoka, Japan, May 20-24, 2013, R1-132055, Agenda item: 6.2.4, Document for: Discussion & Decision, 3 pages.
"LTE; Evolved Universal Terrestrial Radio Access (E-UTRA) and Evolved Universal Terrestrial Radio Access Network (E-UTRAN); Overall description; Stage 2" (3GPP TS 36.300 version 117.0 Release 11), ETSI TS 136 300 V11.7.0 (Sep. 2013), 222 pages.
Intel Corporation, "Discussion on PRACH Coverage Enhancement tor Low Cost MTC", 3GPP TSG RAN WG1 Meeting #74, Barcelona, Spain, Aug. 19-23, 2013, R1-132930, Agenda item: 7.2.4.2, Document tor: Discussion/Decision, 8 pages.
Alcatel-Lucent, Alcatel-Lucent Shanghai Bell, "On scalable spectral efficiency for coverage enhancement", Barcelona, Spain, Aug. 19-23, 2013, 3GPP TSG-RAN WG1 Meeting #74, R1-132969, Agenda item: 7.2.4.2, Document tor: Discussion & Decision, 2 pages.
Alcatel-Lucent, Alcatel-Lucent Shanghai Bell, "Coverage enhancement tor PRACH", Barcelona, Spain, Aug. 19-23, 2013, 3GPP TSG-RAN WG1 Meeting #74, R1-132971, Agenda item: 7.2.4.2, Document tor: Discussion & Decision, 4 pages.
International Search Report for PCT/CN2013/084448 dated Jun. 20, 2014.

* cited by examiner

METHODS AND DEVICES FOR RANDOM ACCESS

TECHNICAL FIELD

The present disclosure generally relate to wireless communication, particularly to methods and devices for random access in a wireless communication system comprising at least one Coverage Enhanced Machine Type Communication User Equipments (CE-MTC UEs).

BACKGROUND

Machine Type Communication (MTC) UE is a UE that is used by a machine for specific application. An example of such MTC UE is smart utility meter. Some of MTC UEs such as smart utility meters are located in basement, which suffer from high penetration loss and therefore it is difficult for a MTC UE to communicate with the network. Therefore, in the third Generation Partnership Project (3GPP), a new Work Item for Low Cost MTC UE and coverage enhancement is approved. The coverage enhancement aspect aims at extending the coverage of such MTC UE by 15 dB. This type of MTC UEs is referred as to Coverage Enhanced MTC UE (CE-MTC UE).

It is recognized during the Study Item phase of this topic that repetition is the main method used for CE-MTC UE. The amount of repetitions required is significant, which however leads to significant degradation to the spectral efficiency. It is therefore more spectrally efficient to have several levels of repetitions to target CE-MTC UE at different coverage level compared to having a single repetition level targeting the CE-MTC UE with the worst radio condition.

Normally, the random access procedure consists of the following message exchange:
1) MSG 1: preamble transmission in the uplink;
2) MSG 2: random Access Response (RAR) in the downlink;
3) MSG 3: e.g. RRC Connection Request in the uplink;
4) MSG 4: Contention Resolution Message in the downlink.

For CE-MTC UE, each of these messages of the random access procedure requires numerous repetitions.

The random access procedure for CE-MTC UEs has not been discussed in detail yet and hence no solution has been proposed in the prior art.

SUMMARY

One or more method and apparatus embodiments according to the present disclosure aim to provide a random access solution for a UE, especially for a CE-MTC UE.

According to an aspect of the present disclosure, there is provided a method for random access in abase station. The method comprises: receiving from a user equipment, repetition transmissions of a first message including a random access preamble; repeatedly transmitting to the user equipment a second message including a random access response, RAR, wherein the second message has a characteristic dependent upon a first repetition level.

According to an aspect of the present disclosure, there is provided a base station. The base station comprises: a receiving unit configured to receive from a user equipment, repetition transmissions of a first message including a random access preamble; a transmitting unit configured to repeatedly transmit to the user equipment a second message including a random access response, RAR, wherein the second message has a characteristic dependent upon a first repetition level.

According to an aspect of the present disclosure, there is provided a method for random access in a user equipment. The method comprises: repeatedly transmitting to a base station a first message including a random access preamble; receiving from the base station repetition transmissions of a second message including a RAR, wherein the second message has a characteristic dependent upon a first repetition level.

According to an aspect of the present disclosure, there is provided a user equipment. The user equipment comprises: a transmitting unit configured to repeatedly transmit to a base station a first message including a random access preamble; a receiving unit configured to receive from the base station repetition transmissions of a second message including a RAR, wherein the second message has a characteristic dependent upon a first repetition level.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of LTE or LTE-A type wireless communication system for illustrative purposes, those skilled in the art will recognize that one or more embodiments of the present disclosure can also be applied to various other type of wireless communication systems. Thus, the following aspects, features, embodiments and advantages are only for illustrative purposes, and should not be understood as elements or limitations of the appended claims, unless otherwise explicitly specified in the claims.

Figure 1:
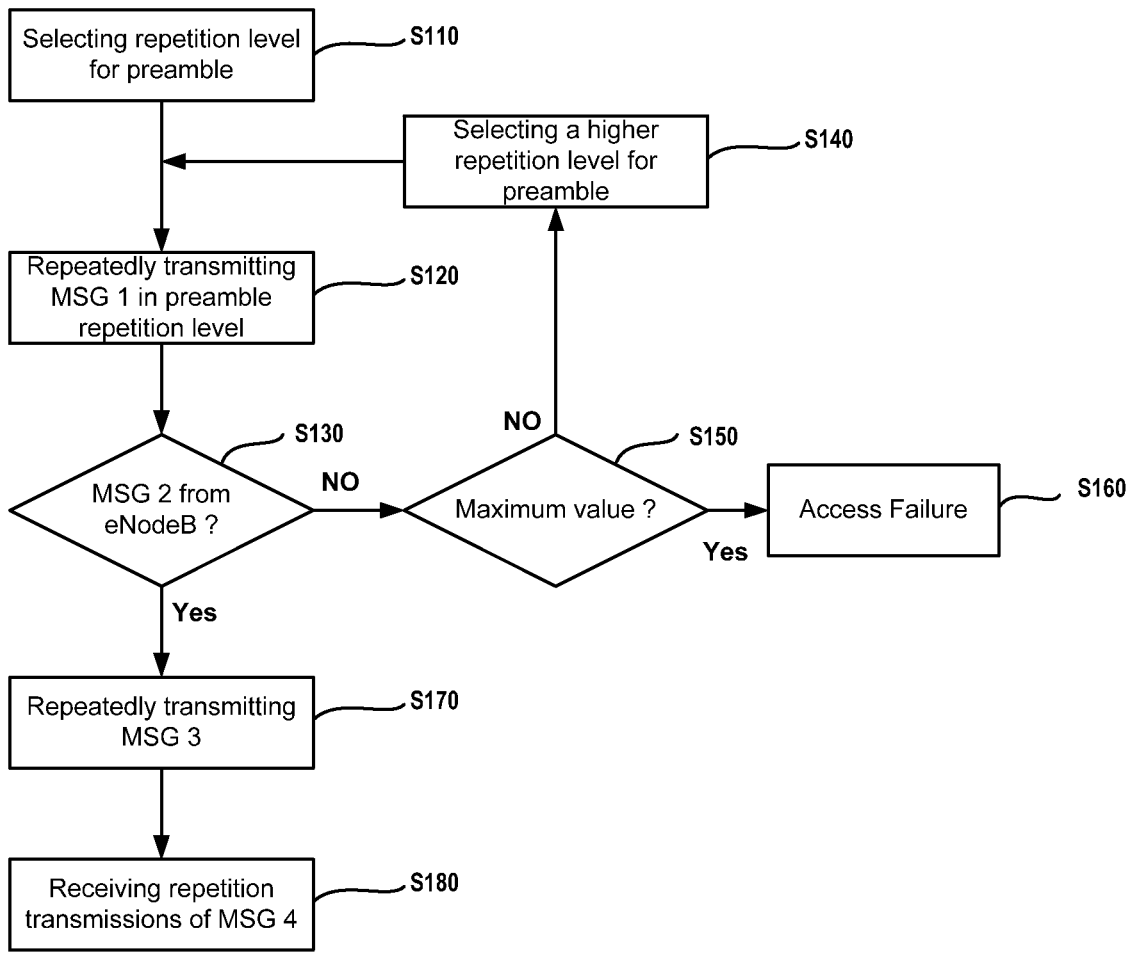
FIG. 1 is a diagram schematically illustrating a random access procedure for CE-MTC UE.

FIG. 1 shows a possible random access process for a user equipment such as CE-MTC UE, which is based on the legacy RACH process.

In block S110, the user equipment such as CE-MTC UE measures its path loss and selects a repetition level for preamble appropriate for this path loss. It is assumed that the number of repetition levels is finite (e.g. 3 levels) in the system and the configuration of different repetition levels may be signaled by a base station such as eNodeB for example in the system information block.

In block S120, the CE-MTC UE performs repetition transmissions of Message 1 including a random access preamble. After the preamble repetitions are transmitted, the CE-MTC UE would wait for Message 2 including the random access response (RAR) from the eNodeB. The RAR would also be repeatedly transmitted by the eNodeB.

In block S130, it is determined whether the CE-MTC UE received the RAR from the eNodeB. If the CE-MTC UE fails to receive a RAR, it would retry selecting a higher repetition level in block S140 for transmitting its preamble included in Message 1, assuming that the previous repetition level was not sufficient. It is of course possible that a collision occurred in the previous preamble transmission but the CE-MTC UE at this point is unaware of this.

If it is determined in block S150 that the maximum value of transmission trials has been reached, then the CE-MTC UE fails in the random assess procedure.

Once the CE-MTC UE receives the RAR from the eNB, it then transmits Message 3 in block S170 and then receives in block S180 Message 4 including contention resolution message repeatedly transmitted by the eNodeB.

Since the preamble requires numerous repetitions, random access channel (RACH) resources for the transmission of these preamble repetitions would span numerous subframes. The start and end of such RACH resources needs to be clearly defined such that the eNodeB knows when to start accumulating energy for the preamble repetitions. RACH resource would therefore consume large amount of physical resources and therefore preamble of different repetition levels may have overlapping RACH resources.

As numerous repetitions are needed in the random access procedure, it is beneficial to define repetition levels so that fewer repetitions can be transmitted for the UEs that have relatively better radio condition. Otherwise, both uplink and downlink have to use the maximum repetitions. In the prior art, as there is no knowledge about the suitable repetition level during the random access, so the safe method for both eNodeB and UEs is to use the maximum repetitions. However, it is not resource efficient. Various embodiments of the present disclosure consider some aspect of random access procedure in context of reducing resource cost in random access procedure.

Figure 2:
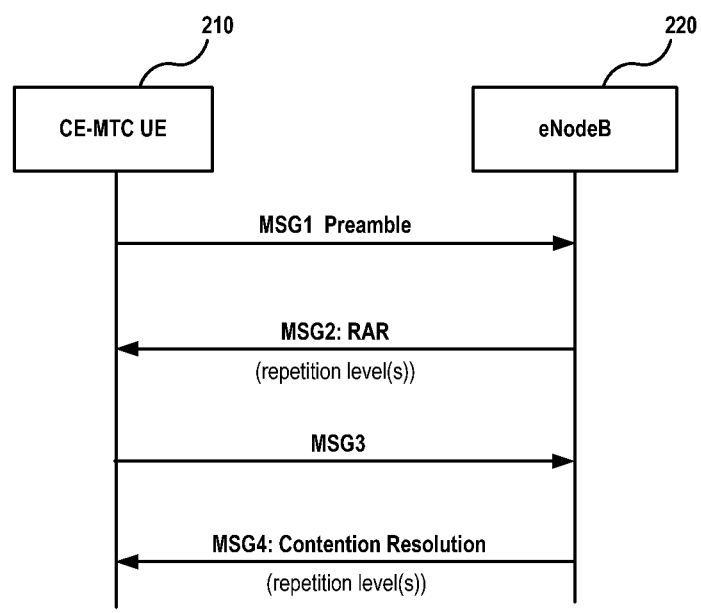
FIG. 2 is a diagram schematically illustrating a random access procedure between a user equipment and a base station.

FIG. 2 is a diagram schematically illustrating a contention-based random access procedure.

In a contention-based random access procedure, the CE-MTC UE 210 initiates the random procedure by repeatedly transmitting a second message (MSG1) including a random access preamble in a selected repetition level. The repetition level of the preamble may be pessimistic (i.e. more than required) since a collision in the preamble would lead to the CE-MTC UE to transmit at a higher repetition level.

The eNodeB 220 monitors the uplink channel to detect the preamble based the preamble repetition transmissions. The eNodeB 220 repeatedly transmits to the CE-MTC UE 210 a second message (MSG2) including a RAR to acknowledge the successfully detected preamble in a RAR repetition level. In one embodiment, the RAR repetition level may be dependent upon the preamble repetition level of the CE-MTC UE that the eNB intends to response to. The MSG2 is configured to have a characteristic dependent upon a repetition level such that the eNodeB 220 can inform the CE-MTC UE 210 of repetition level information to facilitate its repetition level selection in subsequent random access procedure.

If the CE-MTC UE 210 receives MSG2, then the CE-MTC UE 210 will retrieve the repetition level information indicated by MSG2 and perform repetition transmissions of a third message (MSG3) to the eNodeB 220 in a repetition level. Then, the CE-MTC UE 210 monitors the response from the eNodeB 120.

The eNodeB 220 attempts to resolve any contentions and repeatedly transmits to the CE-MTC UE 210 a fourth message (MSG4) including a contention resolution. In one or more embodiments of the present disclosure, the fourth message may also be configured to have a characteristic dependent upon a repetition level, for example to configure the repetition level to be used in subsequent communication.

According to various embodiments, MSG 2 is configured to have a characteristic dependent upon a repetition level. In the prior art, the RA-RNTI is derived by the start subframe of the preamble and the index of the frequency resource used (See 3GPP TS 36.321). Therefore, in order to carry the information of repetition level, in one embodiment, the RA-RNTI in the RAR may be computed at least based on the repetition level used.

Figure 3:
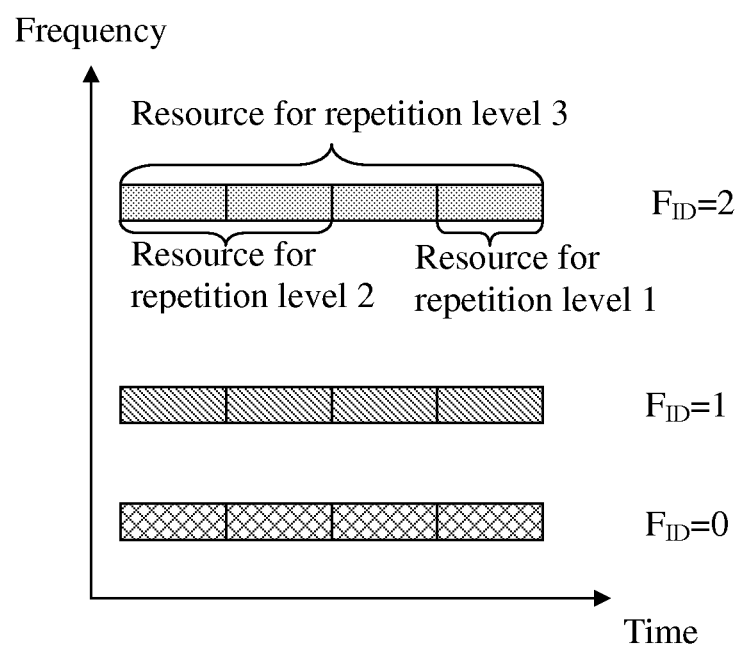
FIG. 3 schematically illustrates an exemplary RACH resource allocation.

Considering a specific example, the eNodeB configures 3 repetition levels. To save on resource, the RACH resource for all 3 repetition levels overlap as shown in FIG. 3. Here, the RACH resources occupies 3 distinct frequency groups, labeled as $F_{ID}=1, 2$ and 3. The same frequency group can be used to transmit preambles at different repetition levels as shown in FIG. 3. In order to carry the information of repetition level, the RA-RNTI used in the RAR can therefore be computed as:

$$RA\text{-}RNTI = 1 + T_{ID} + 10*F_{ID} + 60*R_{ID}$$

where $T_{ID}$ is the subframe where the preamble repetition starts ($0 \leq T_{ID} < 10$), $F_{ID}$ is the frequency index ($0 \leq F_{ID} < 6$), as described in FIG. 3 and $R_{ID}$ is the repetition level ($0 \leq R_{ID} < 3$).

It should be appreciated that RACH resource for different repetition level can overlap and it is therefore more likely that the same subframe and frequency resource are used by more than one CE-MTC UE. Furthermore, it is feasible that the RACH resource is also shared with normal UE (i.e. not in coverage enhanced mode). A RA-RNTI that is dependent upon the repetition help differentiate CE-MTC UE and normal UE using different repetition level thereby help to resolve contention among them. Note that normal UE may be considered as using a repetition level that has no repetition (i.e. a single transmission).

In an alternative embodiment, MSG 2 may be scrambled by a scrambling code dependent upon a repetition level. When MSG 2 is correctly descrambled by the CE-MTC UE by using a particular scrambling code, then CE-MTC UE is able to determine the repetition level informed by the eNodeB based on mapping relationship between the scramble codes and repetition levels. Alternatively or additionally, MSG 4 may also be scrambled by a code dependent upon a repetition level so as to implicitly signal the repetition level for performing subsequent communication with the CE-MTC UE.

For scenario where plural RARs are multiplexed in a single message, those RARs are for different CE-MTC UEs using the same repetition levels (but use different subframe and frequency resources). If RARs for different repetition levels contained in one signal message, then no scrambling code or a common scrambling code can be used to implicitly signal the repetition level.

In one or more alternative embodiments, repetition level(s) may be explicitly carried by the downlink control message(s). In an implementation, MSG 2 may be configured to has a specific field to indicate the repetition level(s). Similarly, MSG 4 may also be configured to have a specific field to indicate the repetition level (s) of which the eNodeB intends to inform the corresponding CE-MTC UE.

In one embodiment, the repetition level indicated by MSG 2 may be indicative of a repetition level in which the base station repeatedly transmits MSG 2, i.e., the repetition level of the RAR. This can be used to filter out CE-MTC UE that somehow successfully decodes the RAR but uses a different repetition level. In another embodiment, the repetition level indicated in MSG 2 may be additionally or alternatively indicative of a repetition level which the base station expects the user equipment to use in repeatedly transmitting MSG 3. Particularly, in an advantageous implementation, the repetition level indicated in the second message may be represented in a form of a single index that indicates both the repetition level for the RAR message and that for MSG 3. In another embodiment, this repetition level can also be used to derive/indicate the repetition level which is to be used by the base station in repeatedly transmitting MSG 4 Contention Resolution message.

MSG 3 can contain the RRC message where the CE-MTC UE can indicate its preferred downlink repetition level based on reception of the RAR quality.

MSG 4 can contain the repetition level indicative of a repetition level in the uplink and downlink that the eNodeB would use for the CE-MTC UE. Hence, in an embodiment, the Contention Resolution indicates the repetition level, e.g. in the form of an index, for all downlink and uplink channels/messages of subsequent communication.

Figure 4:
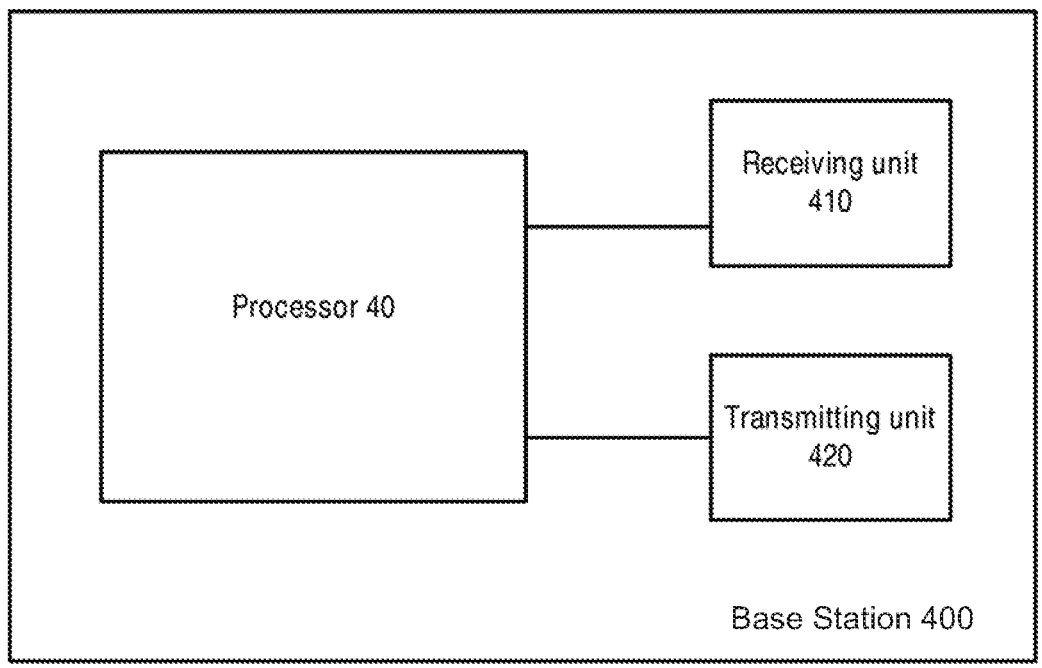
FIG. 4 is a block diagram schematically illustrating a base station according to one or more embodiments of the present disclosure.

FIG. 4 is a block diagram schematically illustrating a base station 400 according to one or more embodiments of the present disclosure.

As shown in FIG. 4, the base station 400 such as the eNodeB 220 as shown in FIG. 2 comprises a receiving unit 410 and a sending unit 420 for communicating with at least one CE-MTC UE 210 as shown in FIG. 2.

The base station 400 further comprises a processor 40, which includes one or more microprocessor or microcontrollers, as well as other digital hardware, which may include digital signal processors (DSPs), special-purpose digital logic, and the like. The processor 50 may be configured to execute program code stored in memory (not shown in FIG. 4), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The receiving unit 410 is configured to receive from a user equipment, repetition transmissions of a first message (MSG 1) including a random access preamble.

The transmitting unit 420 is configured to repeatedly transmit to the user equipment a second message (MSG 2) including a RAR. The second message is configured to have a characteristic dependent upon a first repetition level.

In one or more embodiments of the present enclosure, RA-RNTI in the RAR is computed by the processor 40 at least based on the first repetition level. Specifically, the RA-RNTI may be computed based on an index of a subframe where the preamble repetition starts, an index of frequency on which the repetition transmissions are performed, and a repetition level index of the first repetition level, which may be determined by the processor 40 and stored in the memory of the base station.

In one or more alternative embodiments, the second message may be scrambled by a scrambling code dependent upon the first repetition level.

In one or more alternative embodiments, the second message may be configured to have a specific field to indicate the first repetition level.

The first repetition level indicated by the characteristic of the second message may be indicative of at least one of a repetition level which is used by the base station in repeatedly transmitting the second message; a repetition level which is to be used by the user equipment in repeatedly transmitting the third message; or a repetition level which is to be used by the base station in repeatedly transmitting the fourth message.

The receiving unit 410 is further configured to receive from the user equipment repetition transmissions of a third message. The transmitting unit 420 is further configured to repeatedly transmit to the user equipment a fourth message including a contention resolution. In one or more embodiments, the fourth message may be configured to have a characteristic dependent upon a second repetition level.

In one or more embodiments of the present disclosure, the fourth message may be scrambled by a code dependent upon the second repetition level.

In one or more embodiments of the present disclosure, the fourth message may be configured to have a specific field to indicate the second repetition level.

The second repetition level indicated by the characteristic of the fourth message may be indicative of the uplink repetition level and the downlink repetition level which are to be used in performing repetition transmissions between the base station and the user equipment after the random access procedure.

Figure 5:
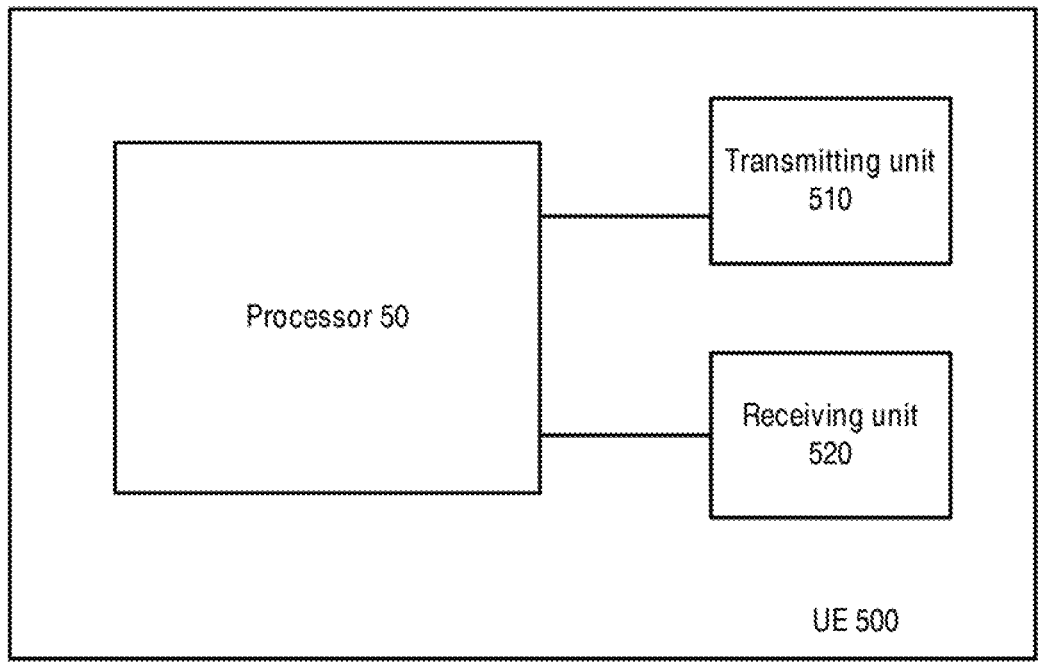
FIG. 5 is a block diagram schematically illustrating a user equipment (UE) according to one or more embodiments of the present disclosure.

FIG. 5 is a block diagram schematically illustrating a user equipment (UE) 500 according to one or more embodiments of the present disclosure.

As shown in FIG. 5, the UE 500 such as the CE-MTC UE 110 as shown in FIG. 2 comprises a transmitting unit 510 and a receiving unit 520 for communicating with a base station such as the eNodeB 220 as shown in FIG. 2.

The UE 500 further comprises a processor 50, which includes one or more microprocessor or microcontrollers, as well as other digital hardware, which may include digital signal processors (DSPs), special-purpose digital logic, and the like. The processor 50 may be configured to execute program code stored in memory (not shown in FIG. 5), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The transmitting unit 510 is configured to repeatedly transmitting to a base station a first message including a random access preamble.

The receiving unit 520 is configured to receiving from the base station repetition transmissions of a second message including a RAR, wherein the second message has a characteristic dependent upon a first repetition level.

In one or more embodiments of the present enclosure, RA-RNTI in the RAR is computed by the processor 50 at least based on the first repetition level. Specifically, the RA-RNTI may be computed based on an index of a subframe where the preamble repetition starts, an index of frequency on which the repetition transmissions are performed, and a repetition level index of the first repetition level, which may be determined by the processor 50 and stored in the memory of the base station.

In one or more alternative embodiments, the second message may be scrambled by a scrambling code dependent upon the first repetition level.

In one or more alternative embodiments, the second message may be configured to have a specific field to indicate the first repetition level.

The first repetition level indicated by the characteristic of the second message may be indicative of at least one of a repetition level which is used by the base station in repeatedly transmitting the second message; a repetition level which is to be used by the user equipment in repeatedly transmitting the third message; or a repetition level which is to be used by the base station in repeatedly transmitting the fourth message.

The transmitting unit 510 is further configured to repeatedly transmit to the base station a third message. The receiving unit 520 is further configured to receive from the base station repetition transmission of a fourth message including a contention resolution. In one or more embodiments, the fourth message may be configured to have a characteristic dependent upon a second repetition level.

In one or more embodiments of the present disclosure, the fourth message may be scrambled by a code dependent upon the second repetition level.

In one or more embodiments of the present disclosure, the fourth message may be configured to have a specific field to indicate the second repetition level.

The second repetition level indicated by the characteristic of the fourth message may be indicative of the uplink repetition level and the downlink repetition level which are to be used in performing repetition transmissions between the base station and the user equipment after the random access procedure.

According to various embodiments of the present disclosure, when performing random access procedure, both CE-MTC UE and the base station can discover a reference a repetition level as soon as possible and then select a suitable one to perform subsequent transmissions, so that the resource during the access stage can be saved.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for random access in a base station, comprising:
   receiving from a user equipment repetition transmissions of a first message including a random access preamble;
   repeatedly transmitting to the user equipment a second message including a random access response, RAR, wherein the second message is configured to have a characteristic dependent upon a first repetition level, wherein the first repetition level is indicative of a repetition level which is to be used by the user equipment in repeatedly transmitting a third message;
   receiving from the user equipment repetition transmissions of the third message; and
   repeatedly transmitting to the user equipment a fourth message including a contention resolution;
   wherein the fourth message is configured to have a field that indicates a second repetition level;
   wherein the second repetition level is indicative of the uplink repetition level and the downlink repetition level to be used in performing repetition transmissions between the base station and the user equipment after the random access procedure.

2. The method according to claim 1, wherein the fourth message is configured to have a characteristic dependent upon the second repetition level.

3. The method according to claim 2, wherein the fourth message is scrambled by a scrambling code dependent upon the second repetition level.

4. The method according to claim 2, wherein the fourth message has a specific field to indicate the second repetition level.

5. The method according to claim 1, wherein a random access radio network temperate identity, RA-RNTI, in the RAR is computed at least based on the first repetition level.

6. The method according to claim 5, wherein the RA-RNTI is computed based on an index of a subframe where the preamble repetition starts, an index of frequency on which the repetition transmissions are performed, and a repetition level index of the first repetition level.

7. The method according to claim 1, wherein the second message is scrambled by a scrambling code dependent upon the first repetition level.

8. The method according to claim 1, wherein the second message has a specific field to indicate the first repetition level.

9. The method according to claim 1, wherein the first repetition level is indicative of at least one of:
  a repetition level which is used by the base station in repeatedly transmitting the second message; or
  a repetition level which is to be used by the base station in repeatedly transmitting the fourth message.

10. The method according to claim 1, wherein the user equipment is a coverage enhanced machine type communication user equipment.

11. A base station, comprising:
  a receiver configured to receive from a user equipment, repetition transmissions of a first message including a random access preamble;
  a transmitter configured to repeatedly transmit to the user equipment a second message including a random access response, RAR, wherein the second message is configured to have a characteristic dependent upon a first repetition level, wherein the first repetition level is indicative of a repetition level which is to be used by the user equipment in repeatedly transmitting a third message;
  the receiver further configured to receive from the user equipment repetition transmissions of the third message;
  the transmitter further configured to repeatedly transmit to the user equipment a fourth message including a contention resolution;
  wherein the fourth message is configured to have a field that indicates a second repetition level; and
  wherein the second repetition level is indicative of the uplink repetition level and the downlink repetition level which are to be used in performing repetition transmissions between the base station and the user equipment after the random access procedure.

12. The base station according to any of claim 11, wherein the fourth message is configured to have a characteristic dependent upon the second repetition level.

13. The base station according to claim 12, wherein the fourth message is scrambled by a scrambling code dependent upon the second repetition level.

14. The base station according to claim 12, wherein the fourth message has a specific field to indicate the second repetition level.

15. The base station according to claim 11, wherein a random access radio network temperate identity, RA-RNTI, in the RAR is computed at least based on the first repetition level.

16. The base station according to claim 15, wherein the RA-RNTI is computed based on an index of a subframe where the preamble repetition starts, an index of frequency on which the repetition transmissions are performed, and a repetition level index of the first repetition level.

17. The base station according to claim 11, wherein the second message is scrambled by a scrambling code dependent upon the first repetition level.

18. The base station according to claim 11, wherein the second message has a specific field to indicate the first repetition level.

19. The base station according to claim 11, wherein the first repetition level is indicative of at least one of: a repetition level which is used by the base station in repeatedly transmitting the second message; or a repetition level which is to be used by the base station in repeatedly transmitting the fourth message.

20. The base station according to claim 11, wherein the user equipment is a coverage enhanced machine type communication user equipment.

21. A method for random access in a user equipment, comprising:
  repeatedly transmitting to a base station a first message including a random access preamble;
  receiving from the base station repetition transmissions of a second message including a RAR, wherein the second message is configured to have a characteristic dependent upon a first repetition level, wherein the first repetition level is indicative of a repetition level which is to be used by the user equipment in repeatedly transmitting a third message;
  repeatedly transmitting to the base station the third message;
  receiving from the base station repetition transmission of a fourth message including a contention resolution;
  wherein the fourth message is configured to have a field that indicates a second repetition level; and
  wherein the second repetition level is indicative of the uplink repetition level and the downlink repetition level which are to be used in performing repetition transmissions between the base station and the user equipment after the random access procedure.

22. The method according to claim 21, wherein the fourth message is configured to have a characteristic dependent upon a second repetition level.

23. The method according to claim 21, wherein the user equipment is a coverage enhanced machine type communication user equipment.

24. A user equipment, comprising:
  a transmitter configured to repeatedly transmit to a base station a first message including a random access preamble;
  a receiver configured to receive from the base station repetition transmissions of a second message including a RAR, wherein the second message is configured to have a characteristic dependent upon a first repetition level, wherein the first repetition level is indicative of a repetition level which is to be used by the user equipment in repeatedly transmitting a third message;
  the transmitter further configured to repeatedly transmit to the base station the third message;
  the receiver further configured to receive from the base station repetition transmission of a fourth message including a contention resolution;
  wherein the fourth message is configured to have a field that indicates a second repetition level; and
  wherein the second repetition level is indicative of the uplink repetition level and the downlink repetition level which are to be used in performing repetition transmissions between the base station and the user equipment after the random access procedure.

25. The user equipment according to claim 24, wherein the fourth message is configured to have a characteristic dependent upon a second repetition level.

26. The user equipment according to claim 24, wherein the user equipment is a coverage enhanced machine type communication user equipment.

* * * * *